(12) United States Patent
Wang et al.

(10) Patent No.: US 12,283,124 B2
(45) Date of Patent: Apr. 22, 2025

(54) METHOD OF TRAINING TEXT QUALITY ASSESSMENT MODEL AND METHOD OF DETERMINING TEXT QUALITY

(71) Applicant: Beijing Baidu Netcom Science Technology Co., Ltd., Beijing (CN)

(72) Inventors: Heng Wang, Beijing (CN); Zhenlei Tian, Beijing (CN); Tianbao Yu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/995,283

(22) PCT Filed: Mar. 22, 2022

(86) PCT No.: PCT/CN2022/082273
§ 371 (c)(1),
(2) Date: Sep. 30, 2022

(87) PCT Pub. No.: WO2023/284327
PCT Pub. Date: Jan. 19, 2023

(65) Prior Publication Data
US 2024/0221404 A1    Jul. 4, 2024

(30) Foreign Application Priority Data

Jul. 12, 2021 (CN) .......................... 202110787492.3

(51) Int. Cl.
*G06V 30/12*  (2022.01)
*G06V 30/19*  (2022.01)

(52) U.S. Cl.
CPC ........ *G06V 30/133* (2022.01); *G06V 30/1912* (2022.01)

(58) Field of Classification Search
CPC .......................... G06V 30/133; G06V 30/1912
See application file for complete search history.

(56) References Cited

U.S. PATENT DOCUMENTS

| 9,600,717 B1 | 3/2017 | Pai et al. |
| 11,507,609 B1 * | 11/2022 | Warmsley ............. G06F 16/335 |

(Continued)

FOREIGN PATENT DOCUMENTS

| CN | 102200969 | 9/2011 |
| CN | 110046340 | 7/2019 |

(Continued)

OTHER PUBLICATIONS

Japanese Office Action issued in the corresponding Japanese Application No. 2022-560062, dated Nov. 28, 2023, 6 pages.

(Continued)

*Primary Examiner* — Kevin Ky
(74) *Attorney, Agent, or Firm* — HSML P.C.

(57) ABSTRACT

A method of training a text quality assessment model, a method of determining text quality, an electronic device, and a storage medium are provided. The method of training the text quality assessment model includes: determining a first text satisfying a condition of being a negative sample and a second text satisfying a condition of being a positive sample from a plurality of texts based on indicators for the texts; for any text of the first text and the second text, adding a label to the text based on the condition satisfied by the text, wherein the label indicates a category of the text, and the category includes a low-quality category for the negative sample and a non-low-quality category for the positive sample; and constituting a training set by the first text having a label and the second text having a label, to train the text quality assessment model.

13 Claims, 5 Drawing Sheets

(56) References Cited

U.S. PATENT DOCUMENTS

| | | | | |
|---|---|---|---|---|
| 2013/0191395 A1* | 7/2013 | Dowlaty | ................ | G06Q 50/01 |
| | | | | 707/740 |
| 2017/0147682 A1* | 5/2017 | Alaqeeli | ................. | G06F 40/30 |
| 2019/0130444 A1 | 5/2019 | Fei et al. | | |
| 2019/0199519 A1 | 6/2019 | Goyal et al. | | |
| 2020/0293720 A1 | 9/2020 | Tu | | |
| 2021/0049700 A1* | 2/2021 | Nguyen | ................. | G06N 3/044 |
| 2021/0209421 A1* | 7/2021 | Liu | ....................... | G06F 18/253 |
| 2024/0296550 A1* | 9/2024 | Hameed | ............... | H04N 23/555 |

FOREIGN PATENT DOCUMENTS

| | | |
|---|---|---|
| CN | 110162779 | 8/2019 |
| CN | 110427609 | 11/2019 |
| CN | 111737446 | 10/2020 |
| CN | 111737476 | 10/2020 |
| CN | 111832312 | 10/2020 |
| CN | 111984793 | 11/2020 |
| CN | 112507082 | 3/2021 |
| CN | 113392218 | 9/2021 |
| JP | 2015-099265 | 5/2015 |
| JP | 2017-215803 | 12/2017 |

OTHER PUBLICATIONS

Aili Shen et al, "A Joint Model for Multimodal Document Quality Assessment", arxiv.org, Cornell University Library, 201 Olin Library Cornell University Ithaca, NY 14853, Jan. 4, 2019, 9 pages.

The extended European search report, issued the corresponding European Patent Application No. 22773587.5, Sep. 12, 2023, 8 pages.

International Search Report and Written Opinion, issued in the corresponding PCT Application No. PCT/CN2022/082273, dated May 27, 2022, 10 pages.

* cited by examiner

METHOD OF TRAINING TEXT QUALITY ASSESSMENT MODEL AND METHOD OF DETERMINING TEXT QUALITY

CROSS-REFERENCE TO RELATED APPLICATION(S)

This application is a Section 371 National Stage Application of International Application No. PCT/CN2022/082273, filed on Mar. 22, 2022, entitled "METHOD OF TRAINING TEXT QUALITY ASSESSMENT MODEL AND METHOD OF DETERMINING TEXT QUALITY", which claims priority to Chinese Patent Application No. 202110787492.3, filed on Jul. 12, 2021, the entire contents of which are incorporated herein in their entireties by reference.

TECHNICAL FIELD

The present disclosure relates to the field of artificial intelligence technology, in particular to the field of natural language processing, the field of deep learning and the field of intelligent recommendation, and more specifically to a method of training a text quality assessment model, a method of determining text quality, an electronic device and a storage medium.

BACKGROUND

With the development of computer technology and network technology, a text as a carrier of information has been fully developed. In order to provide a user with an efficient text search and a text recommendation service, it is usually necessary to assess text quality to provide the user with a high-quality text.

In related art, a manual annotation sample is usually used to train a classification model. Then the classification model is used to predict the text quality, so as to screen the high-quality text from a text library and recommend to the user.

SUMMARY

The present disclosure provides a method of training a text quality assessment model, a method of determining text quality, an apparatus, an electronic device, and a storage medium.

According to an aspect of the present disclosure, a method of training a text quality assessment model is provided, including: determining a first text satisfying a condition of being a negative sample and a second text satisfying a condition of being a positive sample from a plurality of texts based on indicators for the texts: for any text of the first text and the second text, adding a label to the text based on the condition satisfied by the text, wherein the label indicates a category of the text, and the category includes a low-quality category for the negative sample and a non-low-quality category for the positive sample: and constituting a training set by the first text having a label and the second text having a label, to train the text quality assessment model.

According to another aspect of the present disclosure, a method of determining text quality is provided, including: inputting a text to be processed to a text quality assessment model, to obtain output data of the text quality assessment model: and determining a category of the text to be processed based on the output data, wherein the text quality assessment model is trained using the aforementioned method of training the text quality assessment model.

According to another aspect of the present disclosure, an electronic device is provided, including: at least one processor: and a memory communicatively connected to the at least one processor, wherein the memory stores instructions executable by the at least one processor, and the instructions, when executed by the at least one processor, cause the at least one processor to implement the method of training a text quality assessment model and/or the method of determining text quality provided by the present disclosure.

According to another aspect of the present disclosure, a non-transitory computer-readable storage medium having computer instructions stored thereon is provided, wherein the computer instructions are configured to cause a computer to implement the method of training a text quality assessment model and/or the method of determining text quality provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The present disclosure provides a method of training a text quality assessment model, which includes a text determination phase, a label addition phase and a model training phase. In the text determination phase, a first text satisfying a condition of being a negative sample and a second text satisfying a condition of being a positive sample are determined from a plurality of texts based on indicators for the texts. In the label addition phase, for any text of the first text and the second text, a label is added to the text based on the condition satisfied by the text, wherein the label indicates a category of the text, and the category includes a low-quality category for the negative sample and a non-low-quality category for the positive sample. In the model training phase, a training set is constituted by the first text having a label and the second text having a label, to train the text quality assessment model.

Application scenarios of a method and an apparatus provided by the present disclosure will be described below in conjunction with FIG. 1.

Figure 1:
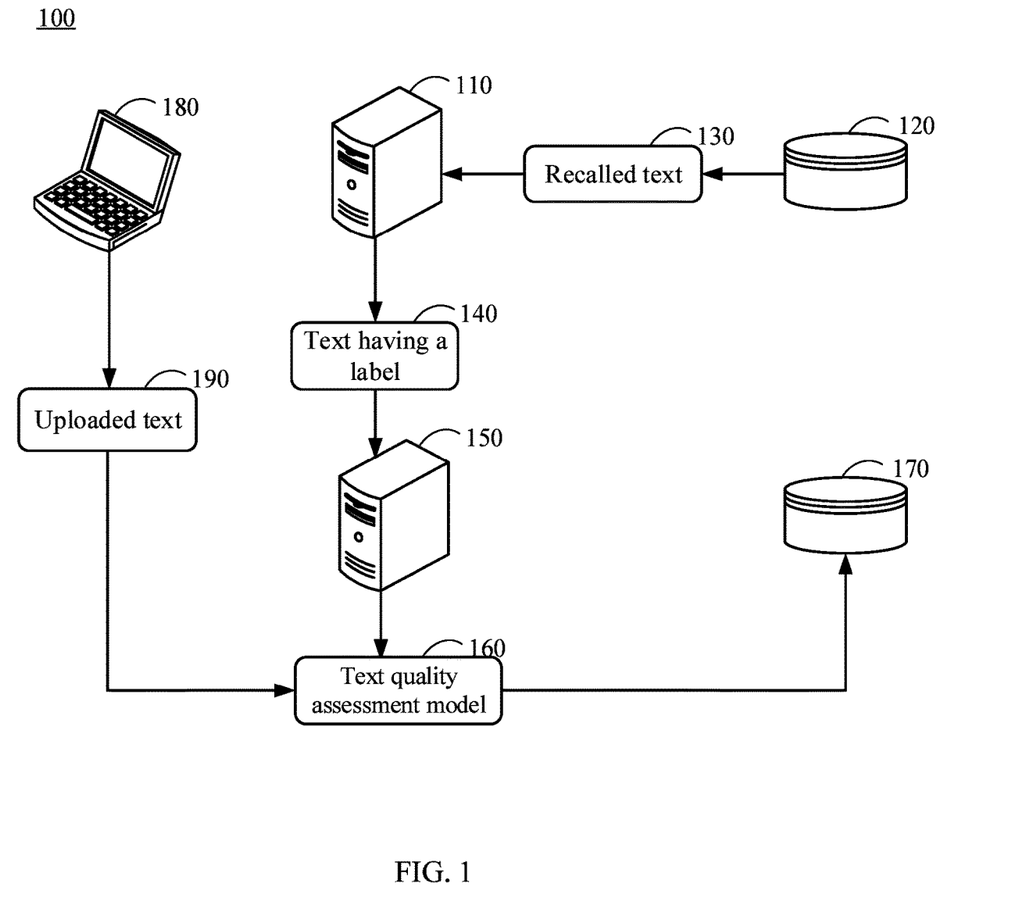
FIG. 1 is a schematic diagram of an application scenario of a method of training a text quality assessment model and/or a method of determining text quality according to an embodiment of the present disclosure.

FIG. 1 is a schematic diagram of an application scenario of a method of training a text quality assessment model and/or the method of determining text quality according to an embodiment of the present disclosure.

As shown in FIG. 1, a scenario 100 of this embodiment includes a first server 110 and a first database 120. For example, the first server 110 may access the first database 120 through a network. The network may include a wired or a wireless communication link.

The first database 120 may be, for example, a text library in which a plurality of texts without quality assessment is maintained. The plurality of texts may be, for example, an answer text provided by a user for a question or any type of text uploaded by the user, which is not limited in the present disclosure.

In one embodiment, the first server 110 may recall, based on a recall rule, a text that satisfies a condition from the first database 120, to obtain a recalled text 130. For example, the recall condition may be set according to indicators such as the number of views, likes and dislikes of the text, to recall a positive sample and a negative sample from the first database 120. A label is added to the recalled text 130 based on the recall condition corresponding to the recalled text 130, to obtain a text 140 having the label. For example, a label indicating a low-quality category is added to the recalled negative sample. A label indicating a non-low-quality category is added to the recalled positive sample.

In one embodiment, as shown in FIG. 1, the application scenario 100 may further include a second server 150. The second server 150 may receive, for example, the text having the label generated by the first server 110 and train a text quality assessment model 160 using the text as a training sample. In this way, the text without quality assessment may be assessed for quality based on the trained text quality assessment model 160. The second server 150 may, for example, further access the first database 120 through the network, so as to acquire the text without quality assessment from the first database 120. The second server 150 may further write a text with quality assessment into a second database 170.

In one embodiment, as shown in FIG. 1, the application scenario 100 may further include a terminal device 180. The terminal device 180 may be various electronic devices with a human-computer interaction function, including but not limited to a smart phone, a tablet computer, a laptop and a desktop computer, etc. The terminal device 180 may, for example, interact with the second server 150 through the network. For example, the terminal device 180 may send a text 190 uploaded by the user via the terminal device 180 to the second server 150, so that the second server 150 uses the text quality assessment model 160 to perform quality assessment on the uploaded text 190. The second server 150 may further write the uploaded text and its quality assessment result into the second database 170 after completing the quality assessment.

In one embodiment, the application scenario may be a question-and-answer comprehension technology scenario. The question-and-answer comprehension technology refers to matching an appropriate answer or determining whether the answer satisfies a requirement of a question through a semantic understanding of a question text. With the rapid development of the Internet, a large amount of information is generated every day. In order to obtain the large amount of information, more and more search engines are developed and used. Through the semantic understanding technology, each search engine retrieves information related to the user's needs from a respective information base and feeds it back to the user. Through the application scenario of FIG. 1, the text quality assessment model 160 may be used to perform quality assessment on the answer text for each question. In this way, it is convenient for each search engine to recall a high-quality answer and feed it back to the user according to the question text provided by the user, so as to improve the user experience.

In one embodiment, the first server 110 and the second server 150 may, for example, be the same server. The first database 120 and the second database 170 may, for example, be two storage partitions of the same database. For example, the first server 110 may further train the text quality assessment model based on the obtained text having the label.

It should be noted that the method of training the text quality assessment model and/or the method of determining text quality provided by the embodiments of the present disclosure may generally be executed by the second server 150, or may be partly executed by the first server 110 and partly executed by the second server 150. Accordingly, the apparatus of training the text quality assessment model and/or the apparatus of determining text quality provided by the embodiments of the present disclosure may be disposed in the second server 150, or may be partially disposed in the first server 110 and partially disposed in the second server 150.

It should be understood that the number and type of the first server, the second server, the first database, the second database and the terminal device in FIG. 1 are only schematic. According to the implementation needs, it may have any data and type of the first server, the second server, the first database, the second database and the terminal device.

The method of training the text quality assessment model provided by the present disclosure will be described in detail below through the following FIG. 2 to FIG. 5 combined with FIG. 1.

Figure 2:
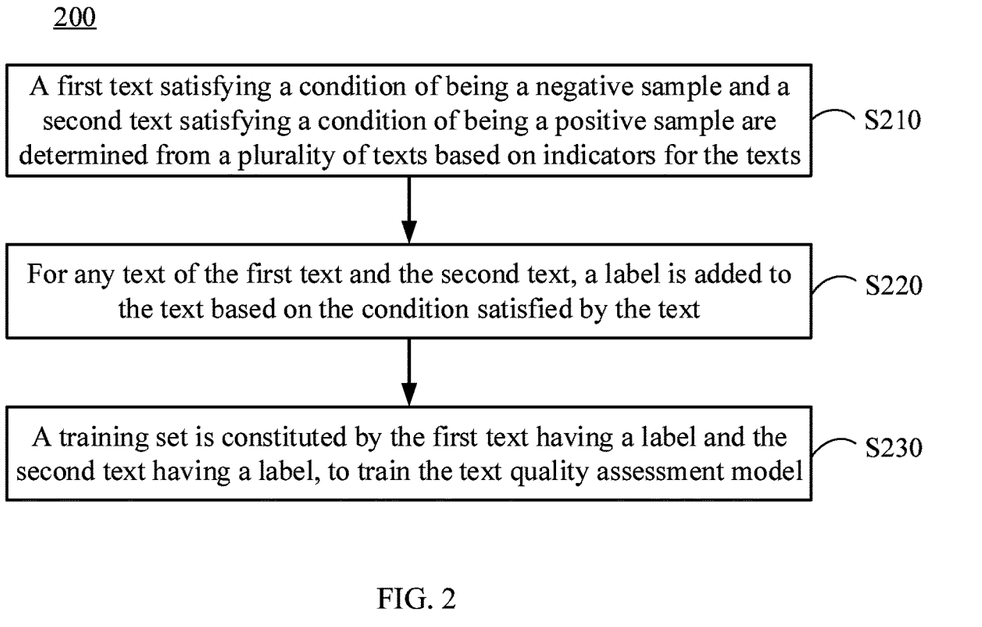
FIG. 2 is a flowchart of a method of training a text quality assessment model according to an embodiment of the present disclosure.

As shown in FIG. 2, a method 200 of training the text quality assessment model of this embodiment may include operations S210 to S230.

In operation S210, a first text satisfying a condition of being a negative sample and a second text satisfying a condition of being a positive sample are determined from a plurality of texts based on indicators for the texts.

For example, a plurality of indicators related to a text may be obtained by counting an interactive behavior generated for the text. The indicators for the text may, for example, represent the situation that the text is browsed or manipulated by users other than a publisher of the text. For example, the indicators may include the number of views, likes, and dislikes of the text, and the situation that the text is adopted. In one embodiment, the indicators for the text may, for example, represent indicators for the publisher of the text. The indicators for the publisher may include, for example, a level of an associated account of the publisher, whether the associated account is a member account, the number of texts published by the publisher, the quality of the text published by the publisher, and the like. Alternatively, the indicators for the text may include, for example, a presentation property of the text, such as a presentation position with respect to the plurality of texts, the presentation integrity of the text, whether the text is presented in a folded mode, and the like. The present disclosure does not limit the indicators for the text, as long as the indicators for the text may reflect the quality of the text to a certain extent.

According to an embodiment of the present disclosure, the plurality of texts may, for example, be all the texts maintained in the text library. A condition of being the negative sample and a condition of being the positive sample are conditions set according to the indicators for the text. For example, the condition of being the negative sample may be that the number of dislikes is greater than or equal to a threshold value of dislikes. The condition of being the positive sample may be that the number of likes is greater than or equal to a threshold value of likes. In order to improve the accuracy of the recalled second text that satisfies the condition of being the positive sample, a higher requirement on the text quality may be provided for a boundary of the condition of being the positive sample than a boundary of the condition of being the negative sample. The condition of being the negative sample and the condition of being the positive sample may be set as required in practice, which is not limited in the present disclosure.

In operation S220, for any text of the first text and the second text, a label is added to the text based on the condition satisfied by the text.

According to an embodiment of the present disclosure, the label may, for example, indicate a category of any text. For example, if the text is the first text that satisfies the condition of being the negative sample, a label indicating the low-quality category is added to the text. If the text is the second text that satisfies the condition of being the positive sample, a label indicating the non-low quality category is added to the text. For example, the label indicating the low-quality category may be represented by 1. The label indicating the non-low-quality class may be represented by 0.

In operation S230, a training set is constituted by the first text having a label and the second text having a label, to train the text quality assessment model.

According to an embodiment of the present disclosure, any text in the training set may be used as an input of the text quality assessment model. An assessment result of whether the text is the low-quality category may be obtained based on output data of the text quality assessment model. The assessment result may be compared with the category indicated by the label of the text. The text quality assessment model may be trained by using a gradient descent algorithm or a back propagation algorithm according to the comparison result.

The text quality assessment model may be, for example, a classification model for determining whether a category of the text quality is the low-quality category. The classification model may include, for example, a fastText model, a textCNN model, an RCNN model, a Bi-LSTM model, and the like. The classification model includes a semantic feature extraction layer and a fully connected layer. The semantic feature extraction layer is configured to extract a semantic feature. The fully connected layer is configured to map the semantic feature to a category-dimensional space and output a classification prediction result.

To sum up, according to the embodiments of the present disclosure, when training the text quality assessment model, the text that satisfies the condition is recalled from the text library based on the indicators, and the label is added to the text based on the condition that the text satisfies, so as to achieve an automatic generation of a sample set. When sample data of a certain category is sparse, the training set generated by recalling the text that satisfies the condition may balance a proportion of the sample data of each category. Therefore, it is convenient for the text quality assessment model to fully learn the relationship between text features and various quality assessment results during the training process, so as to improve the accuracy and stability of the trained text quality assessment model. Furthermore, cold start training of the model may be achieved based on the training method of this embodiment.

Figure 3:
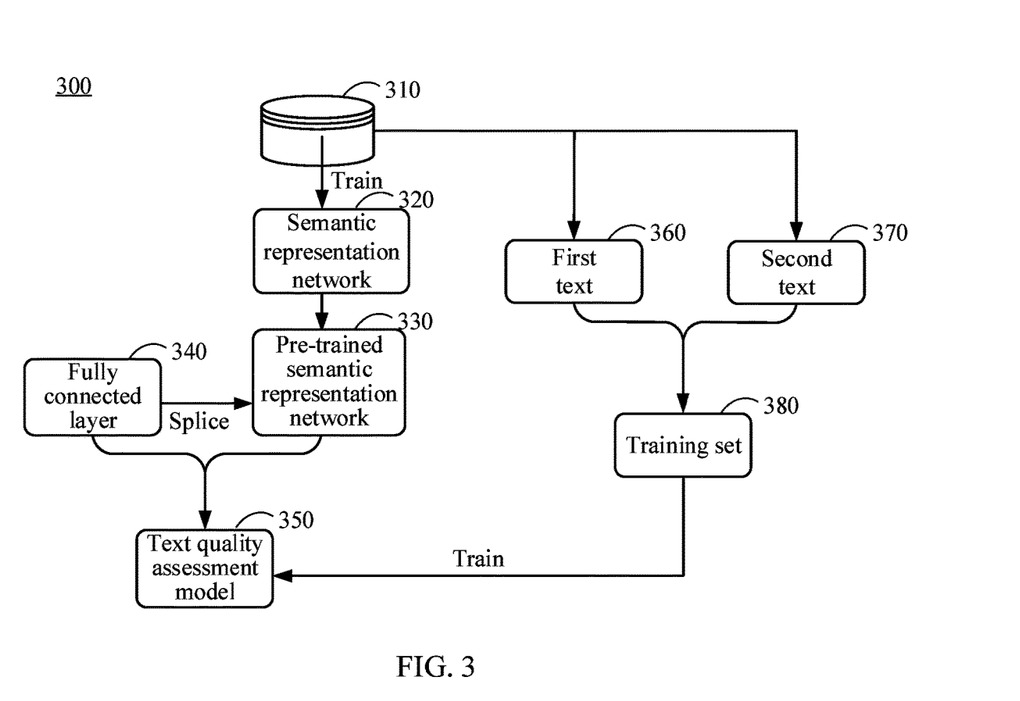
FIG. 3 is a principle schematic diagram of a method of training a text quality assessment model according to an embodiment of the present disclosure.

FIG. 3 is a principle schematic diagram of a method of training a text quality assessment model according to an embodiment of the present disclosure.

According to an embodiment of the present disclosure, the text quality assessment model may include, for example, a semantic representation network, so that the extracted text feature may more accurately express the semantics of the text. In one embodiment, the semantic representation network may, for example, employ a pre-trained model. The pre-trained model may include an Embeddings form Language Model (ELMo) or a transformer-based Bidirectional Encoder Representation from Transformers (BERT) model, etc. In this embodiment, the semantic representation network may be pre-trained in advance. The pre-trained semantic representation network may be used to construct the text quality assessment model.

As shown in FIG. 3, according to a method 300 of training the text quality assessment model of this embodiment, it is possible to first train a semantic representation network 320 based on a plurality of texts in a text library 310, to obtain a pre-trained semantic representation network 330. Then, based on the pre-trained semantic representation network 330, a text quality assessment model 350 is obtained by splicing network structures such as a fully connected layer 340 in an output direction of the pre-trained semantic representation network 330.

According to an embodiment of the present disclosure, taking the semantic representation network 320 as the BERT model as an example, when training the semantic representation network 320, two pre-trained tasks may be constructed, namely, a Masked Language Model (MLM) task and a Next Sentence Prediction (NSP) task. When completing the MLM task, a token in each training sequence may be randomly replaced with a mask token ([MASK]) with a pre-determined probability (e.g. 15%), and then a word at the position of [MASK] may be predicted. The BERT model is trained according to a difference between the predicted word and a true word at the position of [MASK]. When completing the NSP task, for example, two sentence texts (a sentence text A and a sentence text B) may be randomly selected from the text library to form a training sample. There is a probability of 50% that the sentence text B is a next sentence of the sentence text A (labeled as IsNext). There is a remaining probability of 50% that the sentence text B is a random sentence text in the text library (labeled as NotNext). Then the training sample is input into the BERT model to predict the binary classification. The BERT model is trained according to the difference between the prediction result and the label.

As shown in FIG. 3, after obtaining the text quality assessment model 350, at least one first text 360 and at least one second text 370 may be recalled from the text library 310 using the method described above. A training set 380 may be obtained by respectively adding labels to the first text 360 and the second text 370. Then, the text quality assessment model 350 is trained based on the training set 380. It may be understood that the operation of recalling the first text 360 and the second text 370 from the text library 310 may be performed simultaneously with the aforementioned operation of training the semantic representation network, or the two operations may be performed based on any order, which is not limited in the present disclosure.

In this embodiment, the semantic representation network is pre-trained based on all the texts. The text quality assessment model is constructed based on the pre-trained semantic representation network, so that the semantic expression capability of the obtained text quality assessment model may be improved. This is because the semantic representation network is used to extract semantic features and is not affected by sparse samples. Therefore, the accuracy and stability of the trained text quality assessment model may be improved to a certain extent.

According to an embodiment of the present disclosure, the aforementioned method of using the training set obtained by the recall method to train the text quality assessment model is essentially a weakly supervised learning method. After the training of the text quality assessment model by using the training set, according to the embodiments, at least one training text each having a manual annotation label may further be employed to perform strong supervised learning on the text quality assessment model. Specifically, the text quality assessment model trained by using the training set is retrained with a target text having the manual annotation label indicating a true category of the text as the training sample. The retrained process is similar to the training process based on the training set described above. In this way, the accuracy and stability of the trained text quality assessment model may be further improved. The true category of the text may include the low-quality category and the non-low-quality category.

Figure 4:
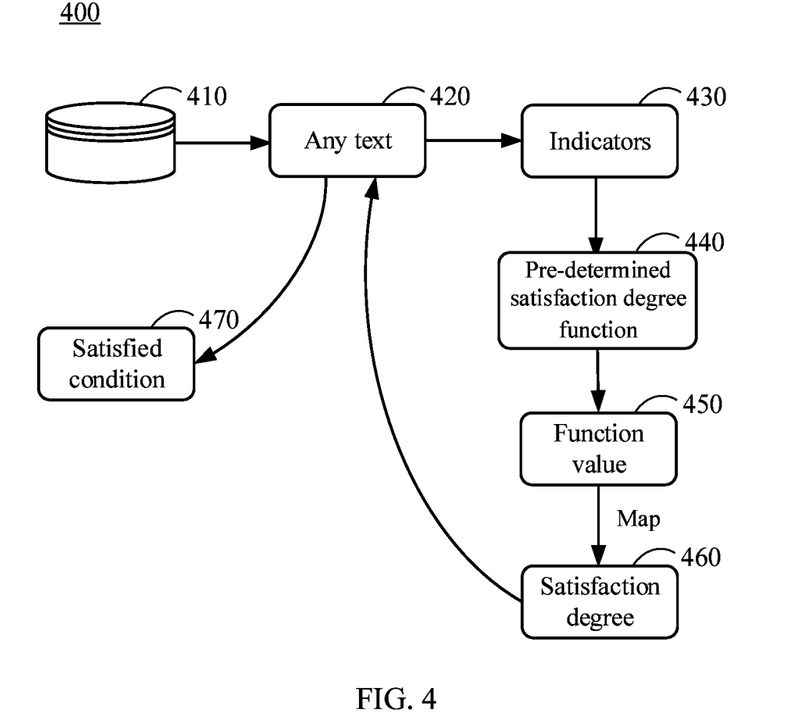
FIG. 4 is a principle schematic diagram of determining a first text satisfying a condition of being a negative sample and a second text satisfying a condition of being a positive sample according to an embodiment of the present disclosure.

FIG. 4 is a principle schematic diagram of determining a first text satisfying a condition of being a negative sample and a second text satisfying a condition of being a positive sample according to an embodiment of the present disclosure.

According to an embodiment of the present disclosure, as shown in FIG. 4, when recalling the first text and the second text from a text library 410 in an embodiment 400, for example, for any text 420 in the text library 410, a satisfaction degree for the text 420 may be determined based on indicators 430 for the text 420. Then, whether the text is the first text, the second text, or another text other than the first text and the second text is determined based on the satisfaction degree for the text. If the text 420 is the first text or the second text, then the text is read from the text library 410.

According to an embodiment of the present disclosure, whether the satisfaction degree for the text is less than a first threshold may be determined. If the satisfaction degree for the text is less than the first threshold, the text is determined as the first text, that is, the text is a text that satisfies the condition of being the negative sample. If the satisfaction degree for the text is greater than the first threshold and greater than or equal to a second threshold, the text may be determined as the second text, that is, the text is a text that satisfies the condition of being the positive sample. If the satisfaction degree for the text is between the first threshold and the second threshold, the text may be determined as another text. The second threshold is greater than the first threshold. The accuracy of the recalled first and second texts may be improved by setting the first threshold and the second threshold that is greater than the first threshold to determine whether the text is a text that needs to be recalled.

According to an embodiment of the present disclosure, the indicators for the text may include, for example, the aforementioned number of likes and views. The satisfaction degree for the text may, for example, be positively correlated with the number of likes and views. Alternatively, the indicators may include the number of dislikes. The satisfaction degree for the text is negatively correlated with the number of dislikes. Alternatively, the indicators for the text may include, for example, the indicators for the publisher of the text. If the indicators for the publisher of the text include a level of the associated account of the publisher, the satisfaction degree for the text may, for example, be positively correlated with the level. Alternatively, the indicators for the publisher may include the quality of the text published by the publisher. The satisfaction degree for the text may, for example, be positively correlated with the quality.

In one embodiment, the indicators for the text may be, for example, a plurality of data. The plurality of data may be comprehensively considered when determining the satisfaction degree for the text. In order to facilitate the determination of the satisfaction degree for the text, as shown in FIG. 4, the embodiment may provide a pre-determined satisfaction degree function 440. In this embodiment, a function value 450 of the pre-determined satisfaction degree function 440 may be determined based on the indicators 430 for the text 420. The function value 450 may be regarded as the satisfaction degree. It may be understood that the pre-determined satisfaction degree function 440 may reflect a relationship between the satisfaction degree and each indicator described above (i.e. the positive correlation or the negative correlation). The expression of the pre-determined satisfaction degree function is not limited in the present disclosure.

For example, the pre-determined satisfaction degree function may be expressed as:

$$S = \frac{q_{like} - q_{dislike}^a}{\log_{10} q_{view}} + \frac{q_{like}}{\log_{10} q_{view}} * (b * p_{ado} + c * p_{vip} + d * p_{level}).$$

S is the value of the pre-determined satisfaction degree function. $q_{like}$, $q_{dislike}$, and $q_{view}$ are the number of likes, dislikes, and views of the text, respectively. $p_{ado}$ is used to indicate whether the text is adopted. If the text is adopted, the value of $p_{ado}$ is 1, otherwise the value is 0. $p_{vip}$ is used to indicate whether the associated account of the publisher of the text is the member account. If the associated account is a member account, the value of $p_{vip}$ is 1, otherwise the value is 0. $p_{level}$ is used to indicate the level of the associated account of the publisher of the text. a, b, c, and d are constants whose values are non-negative numbers. The values of such constants may be set as desired in practice, which are not limited in the present disclosure. It may be understood that, the above-mentioned pre-determined satisfaction degree function is only used as an example to facilitate understanding of the present disclosure, which is not limited in the present disclosure.

According to an embodiment of the present disclosure, in order to facilitate statistics, the function value 450 may further be mapped to a pre-determined value range. The value obtained by the mapping may be used as a satisfaction degree 460 for the text 420. For each text in the text library 410, the aforementioned method may be used to obtain the satisfaction degree for each text. Thus, a condition that each text satisfies (i.e. the condition of being the negative sample or the condition of being the positive sample) is determined based on the satisfaction degree, achieving the recall of the first text and the second text.

According to an embodiment of the present disclosure, in a case that the indicators for the text include the indicators for the publisher of the text, it is possible to recall, from the plurality of texts, the first text that satisfies the condition of being the negative sample only according to the indicators for the publisher of the text. This is because the poor performance of the indicators for the publisher of the text may indicate that the publisher of the text has a low knowledge level to a certain extent, so the reference value of the text published by the publisher of the text is usually low. In this way, the problem of sparse samples of negative sample texts may be solved, achieving the targeted recall of the sparse samples.

For example, if the indicators for the publisher of the text are data used to represent a negative impact of the publisher of the text, a text whose indicator for the publisher of the text is greater than a pre-determined indicator threshold may be selected from the plurality texts as the first text. The data used to represent the negative impact of the publisher of the text may include, for example, at least one of: a proportion of published texts being collected texts or a repetition rate of the published texts, and the like. The collected text refers to the published text is a text directly copied from a text published by others. The repetition rate of the published texts refers to a proportion of the same text in all texts of the published texts. It may be understood that the indicators for the publisher of the text are only used as an example to facilitate understanding of the present disclosure, which is not limited in the present disclosure.

Figure 5:
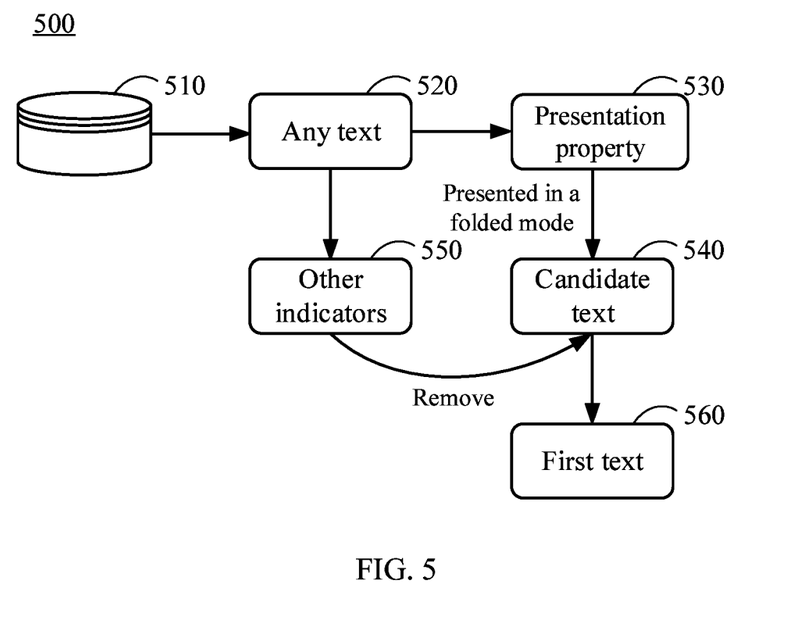
FIG. 5 is a principle schematic diagram of determining a first text satisfying a condition of being a negative sample according to another embodiment of the present disclosure.

FIG. 5 is a principle schematic diagram of determining a first text satisfying a condition of being a negative sample according to another embodiment of the present disclosure.

According to an embodiment of the present disclosure, considering that when the text is presented, a text that is usually presented in the folded mode by a questioner is a text that the questioner thinks it has no reference value. In this embodiment, when the text satisfying the condition of being the negative sample is recalled from the plurality of texts, the text presented in the folded mode may further be recalled based on the presentation property of the text. Correspondingly, the aforementioned indicators for the text should include the presentation property of the text.

For example, as shown in FIG. 5, according to an embodiment 500, for any text 520 in a text library 510, it is possible to determine whether a presentation property 530 of the text 520 indicates that the text 520 is presented in the folded mode or a non-folded mode. If the presentation property of the text 520 indicating that the text 520 is presented in the folded mode, the text 520 is determined as the first text.

In one embodiment, as shown in FIG. 5, a text having a presentation property indicating that the text presented in the folded mode may be used as a candidate text 540. A text with higher reference value is removed from a plurality of candidate texts based on other indicators 550 in indicators for the candidate text. The remaining text is used as a first text 560. In this way, it is possible to avoid the misunderstanding of the negative sample text due to the subjective influence of the questioner. Other indicators may be the behavior data for the text and/or the indicators for the publisher of the text as described above. In this embodiment, a text whose number of likes is higher than a like threshold may be removed from the plurality of candidate texts. Alternatively, a proportion of texts presented in the folded mode in the texts published by a publisher of a certain text in the plurality of candidate texts may be counted. If the proportion of the texts presented in the folded mode is smaller than a fold proportion threshold, the certain text is removed from the plurality of candidate texts. It may be understood that the above-mentioned remove rule is only used as an example to facilitate understanding of the present disclosure, which is not defined in the present disclosure.

In the embodiment of the present disclosure, the first text is obtained by recalling the text presented in the folded mode based on the presentation property, which may further increase a proportion of recalled negative sample texts and solve the problem of sparse samples of negative sample texts. Therefore, it is convenient to improve the accuracy and stability of the trained text quality assessment model.

According to an embodiment of the present disclosure, two or more of the various recall methods described above may be used to recall the first text and the second text from the text library, so as to increase the number of recalled texts. When at least two methods are used to recall the first text and the second text, for example, a de-duplication operation may be performed on the recalled first text and the recalled second text.

Based on the aforementioned method of training the text quality assessment model, the present disclosure further provides a method of determining text quality. This method will be described in detail below in conjunction with FIG. 6.

Figure 6:
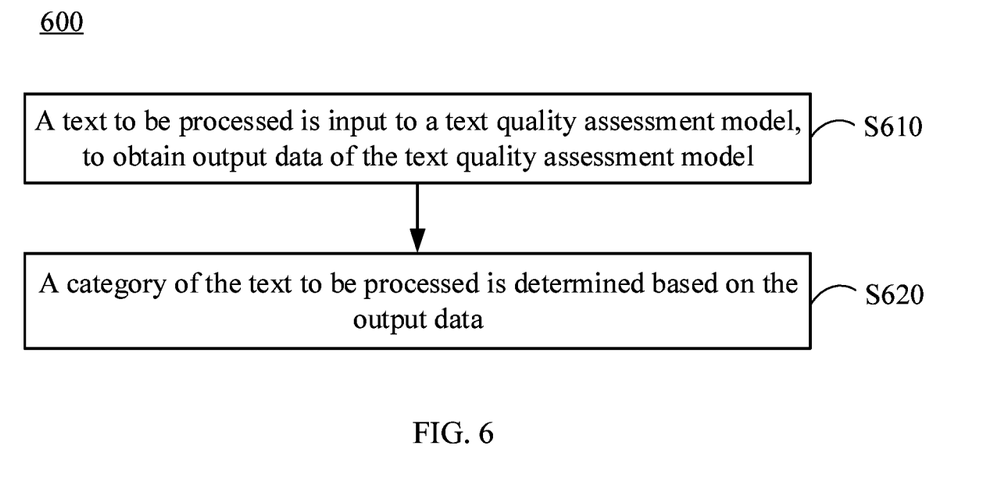
FIG. 6 is a flowchart of a method of determining text quality according to an embodiment of the present disclosure.

FIG. 6 is a flowchart of a method of determining text quality according to an embodiment of the present disclosure.

As shown in FIG. 6, a method 600 of determining text quality of this embodiment may include operations S610 to S620.

In operation S610, a text to be processed is input to a text quality assessment model, to obtain output data of the text quality assessment model.

In operation S620, a category of the text to be processed is determined based on the output data.

The text quality assessment model may be obtained by training through the aforementioned method of training the text quality assessment model. The output data of the text quality assessment model may be directly a classification result. If the classification result is the low-quality category, the text to be processed is determined to be a low-quality text: otherwise, the text to be processed is determined to be a non-low-quality text. Alternatively, the output data of the text quality assessment model may be a probability that the text to be processed is the low-quality text. If the probability is greater than or equal to a probability threshold, a category of the text to be processed is determined to be the low-quality category: otherwise, the category of the text to be processed is determined to be the non-low-quality category.

According to an embodiment of the present disclosure, before inputting the text to be processed to the text quality assessment model, for example, the text to be processed may be encoded first. The encoded sentence vector may be used as the input of the text quality assessment model.

Based on the aforementioned method of training the text quality assessment model, the present disclosure further provides an apparatus of training the text quality assessment model. This apparatus will be described in detail below in conjunction with FIG. 7.

Figure 7:
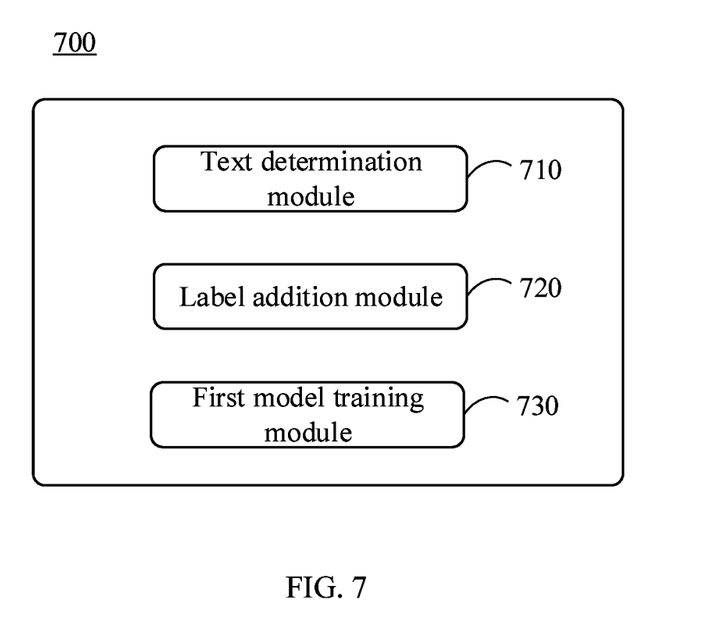
FIG. 7 is a structural block diagram of an apparatus of training a text quality assessment model according to an embodiment of the present disclosure.

FIG. 7 is a structural block diagram of an apparatus of training a text quality assessment model according to an embodiment of the present disclosure.

As shown in FIG. 7, an apparatus 700 of training a text quality assessment model of this embodiment may include a text determination module 710, a label addition module 720 and a first model training module 730.

The text determination module 710 is configured to determine a first text satisfying a condition of being a negative sample and a second text satisfying a condition of being a positive sample from a plurality of texts based on indicators for the texts. In one embodiment, the text determination module 710 may be configured to perform the operation S210 described above, which will not be repeated here.

The label addition module 720 is configured to for any text of the first text and the second text, add a label to the text based on the condition satisfied by the text, wherein the label indicates a category of the text, and the category includes a low-quality category for the negative sample and a non-low-quality category for the positive sample. In one embodiment, the label addition module 720 may be configured to perform the operation S220 described above, which will not be repeated here.

The first model training module 730 is configured to constitute a training set by the first text having a label and the second text having a label, to train the text quality assessment model. In one embodiment, the first model training module 730 may be configured to perform the operation S230 described above, which will not be repeated here.

According to an embodiment of the present disclosure, the above-mentioned text quality assessment model includes a semantic representation network. The above-mentioned apparatus 700 of training the text quality assessment model further includes a network training module and a model obtaining module. The network training module is configured to train the semantic representation network based on the plurality of texts before the first model training module trains the text quality assessment model, to obtain a pre-trained semantic representation network. The model obtaining module is configured to obtain the text quality assessment model based on the pre-trained semantic representation network.

According to an embodiment of the present disclosure, the above-mentioned text determination module 710 may, for example, include a satisfaction degree determination sub-module, a first text obtaining sub-module and a second text obtaining sub-module. The satisfaction degree determination sub-module is configured to determine a satisfaction degree for each text of the plurality of texts based on the indicators for the texts. The first text obtaining sub-module is configured to select, from the plurality of texts, a text having a satisfaction degree less than a first threshold, to obtain the first text. The second text obtaining sub-module is configured to select, from the plurality of texts, a text having a satisfaction degree greater than or equal to a second threshold, to obtain the second text, wherein the first threshold is less than the second threshold.

According to an embodiment of the present disclosure, each text of the plurality of texts is provided with at least two indicators. The above-mentioned satisfaction degree determination sub-module includes a function value determination unit and a satisfaction degree obtaining unit. The function value determination unit is configured to determine a value of a pre-determined satisfaction degree function based on the indicators for the each text. The satisfaction degree obtaining unit is configured to map the value of the pre-determined satisfaction degree function to a pre-determined value range, to obtain the satisfaction degree for the each text.

According to an embodiment of the present disclosure, the indicators for the texts include indicators for publishers of the texts. The above-mentioned text determination module 710 may include a third text obtaining sub-module. The third text obtaining sub-module is configured to select, from the plurality of texts, a text having an indicator for the publisher of the text greater than a pre-determined indicator threshold, to obtain the first text, wherein the indicator for the publisher of the text includes at least one of: a proportion of texts published by the publisher of the text being collected texts and a repetition rate of the texts published by the publisher of the text.

According to an embodiment of the present disclosure, the indicators for the texts include presentation properties of the texts. The above-mentioned text determination module 710 may include a fourth text obtaining sub-module. The fourth text obtaining sub-module is configured to select, from the plurality of texts, a text having a presentation property indicating that the text is to be presented in a folded mode, to obtain the first text.

According to an embodiment of the present disclosure, the indicators for the texts may further include behavior data for the texts and indicators for publishers of the texts. The fourth text obtaining sub-module may include a candidate text obtaining unit and a text removing unit. The candidate text obtaining unit is configured to determine the text selected from the plurality of texts having the presentation property indicating that the text is to be presented in a folded mode as a candidate text. The text removing unit is configured to remove, based on at least one of the behavior data for the text and the indicator for the publisher of the text, a target text from a plurality of candidate texts, to obtain the first text.

According to an embodiment of the present disclosure, the above-mentioned apparatus 700 of training the text quality assessment model further includes a second model training module. The second model training module is configured to retrain, by using a target text as a training sample, the trained text quality assessment model obtained by the first model training module, wherein the target text has a manual annotation label indicating a true category of the text.

Based on the aforementioned method of determining text quality, the present disclosure further provides an apparatus of determining text quality. This apparatus will be described in detail below in conjunction with FIG. 8.

Figure 8:
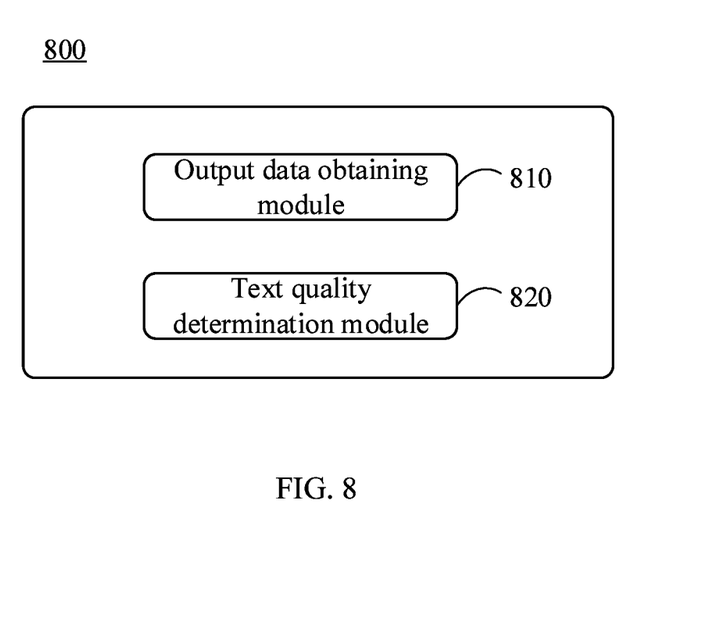
FIG. 8 is a structural block diagram of an apparatus of determining text quality according to an embodiment of the present disclosure.

FIG. 8 is a structural block diagram of an apparatus of determining text quality according to an embodiment of the present disclosure.

As shown in FIG. 8, an apparatus 800 of determining text quality of this embodiment may include an output data obtaining module 810 and a text quality determination module 820.

The output data obtaining module 810 is configured to input a text to be processed to a text quality assessment model, to obtain output data of the text quality assessment model. In one embodiment, the output data obtaining module 810 may be configured to perform the operation S610 described above, which will not be repeated here.

The text quality determination module 820 is configured to determine a category of the text to be processed based on the output data. In one embodiment, the text quality determination module 820 may be configured to perform the operation S620 described above, which will not be repeated here.

It should be noted that, in the technical solution of the present disclosure, the collection, storage, use, processing, transmission, provision, disclosure, and application of the user's personal information involved are in compliance with relevant laws and regulations, take essential confidentiality measures, and do not violate public order and good customs.

In the technical solution of the present disclosure, the authorization or consent of the user is obtained before the user's personal information is acquired or collected.

According to an embodiment of the present disclosure, the present disclosure further provides an electronic device, a readable storage medium, and a computer program product.

Figure 9:
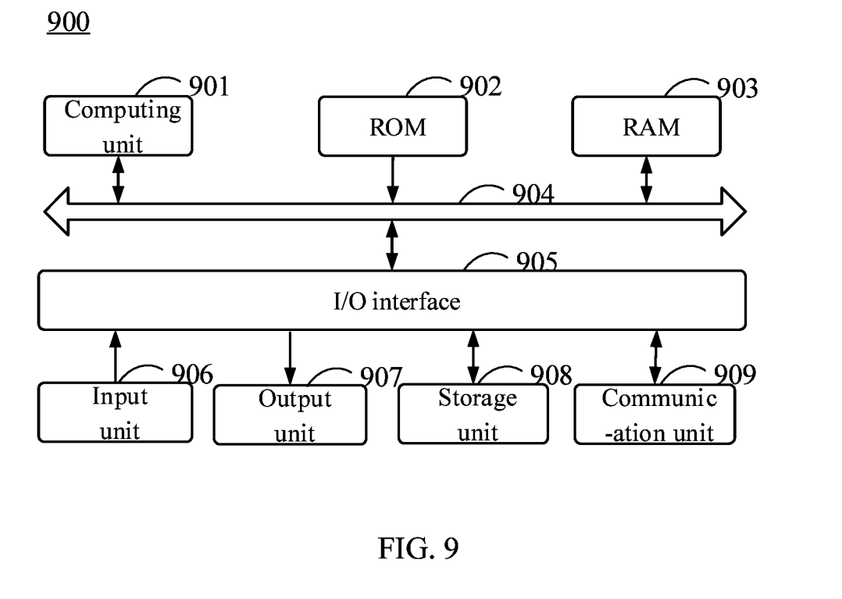
FIG. 9 is a block diagram of an electronic device for implementing a method of training a text quality assessment model and/or a method of determining text quality of an embodiment of the present disclosure.

FIG. 9 is a block diagram of an electronic device 900 for implementing a method of training a text quality assessment model and/or a method of determining text quality of an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the device 900 may include a computing unit 901, which may perform various appropriate actions and processing based on a computer program stored in a read-only memory (ROM) 902 or a computer program loaded from a storage unit 908 into a random access memory (RAM) 903. Various programs and data required for the operation of the device 900 may be stored in the RAM 903. The computing unit 901, the ROM 902 and the RAM 903 are connected to each other through a bus 904. An input/output (I/O) interface 905 is further connected to the bus 904.

Various components in the device 900, including an input unit 906 such as a keyboard, a mouse, etc., an output unit 907 such as various types of displays, speakers, etc., a storage unit 908 such as a magnetic disk, an optical disk, etc., and a communication unit 909 such as a network card, a modem, a wireless communication transceiver, etc., are connected to the I/O interface 905. The communication unit 909 allows the device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 901 may perform the various methods and processes described above, such as the method of training the text quality assessment model and/or the method of determining text quality. For example, in some embodiments, the method of training the text quality assessment model and/or the method of determining text quality may be implemented as a computer software program that is tangibly contained on a machine-readable medium, such as a storage unit 908. In some embodiments, part or all of a computer program may be loaded and/or installed on the device 900 via the ROM 902 and/or the communication unit 909. When the computer program is loaded into the RAM 903 and executed by the computing unit 901, one or more steps of the method of training the text quality assessment model and/or the method of determining text quality described above may be performed. Alternatively, in other embodiments, the computing unit 901 may be configured to perform the method of training the text quality assessment model and/or the method of determining text quality in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also referred to as a cloud computing server or a cloud host, which is a host product in the cloud computing service system to solve shortcomings of difficult management and weak business scalability in conventional physical host and VPS (Virtual Private Server) service. The server may also be a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a text quality assessment model, comprising:
   determining a first text satisfying a condition of being a negative sample and a second text satisfying a condition of being a positive sample from a plurality of texts based on indicators for the plurality of texts;
   for any text of the first text and the second text, adding a label to the text based on the condition satisfied by the text, wherein the label indicates a category of the text, and the category comprises a low-quality category for the negative sample and a non-low-quality category for the positive sample; and
   constituting a training set by the first text having the label and the second text having the label, to train the text quality assessment model,
   wherein the text quality assessment model comprises a semantic representation network and a fully connected layer, the semantic representation network is configured to extract a semantic feature, the fully connected layer is configured to map the semantic feature to a category-dimensional space and output a classification prediction result, and before training the text quality assessment model, the method further comprises:
   training the semantic representation network based on the plurality of texts, to obtain a pre-trained semantic representation network; and
   obtaining the text quality assessment model by splicing the fully connected layer in an output direction of the pre-trained semantic representation network,
   wherein the method further comprises: after training the text quality assessment model,
   retraining the trained text quality assessment model by using a target text as a training sample, wherein the target text has a manual annotation label indicating a true category of the text.

2. The method according to claim 1, wherein determining the first text satisfying the condition of being the negative sample and the second text satisfying the condition of being the positive sample from the plurality of texts comprises:
   determining a satisfaction degree for each text of the plurality of texts based on the indicators for the plurality of texts;
   selecting, from the plurality of texts, a text having a satisfaction degree that is less than a first threshold, to obtain the first text; and
   selecting, from the plurality of texts, a text having a satisfaction degree that is greater than or equal to a second threshold, to obtain the second text,
   wherein the first threshold is less than the second threshold.

3. The method according to claim 2, wherein each text of the plurality of texts is provided with at least two indicators, and determining the satisfaction degree for the each text of the plurality of texts comprises:
   determining a value of a pre-determined satisfaction degree function based on the indicators for the each text; and
   mapping the value of the pre-determined satisfaction degree function to a pre-determined value range, to obtain the satisfaction degree for the each text.

4. The method according to claim 3, wherein the indicators for the plurality of texts comprise indicators for publishers of the plurality of texts, and determining the first text satisfying the condition of being the negative sample from the plurality of texts comprises:
- selecting, from the plurality of texts, a text having an indicator for a publisher of the text that is greater than a pre-determined indicator threshold, to obtain the first text,
- wherein the indicator for the publisher of the text comprises at least one of: a proportion of texts published by the publisher of the text being collected texts, and a repetition rate of the texts published by the publisher of the text.

5. The method according to claim 3, wherein the indicators for the plurality of texts comprise presentation properties of the plurality of texts, and determining the first text satisfying the condition of being a negative sample from the plurality of texts comprises:
- selecting, from the plurality of texts, a text having a presentation property indicating that the text is to be presented in a folded mode, to obtain the first text.

6. The method according to claim 2, wherein the indicators for the plurality of texts comprise indicators for publishers of the plurality of texts, and determining the first text satisfying the condition of being the negative sample from the plurality of texts comprises:
- selecting, from the plurality of texts, a text having an indicator for a publisher of the text that is greater than a pre-determined indicator threshold, to obtain the first text,
- wherein the indicator for the publisher of the text comprises at least one of: a proportion of texts published by the publisher of the text being collected texts, and a repetition rate of the texts published by the publisher of the text.

7. The method according to claim 2, wherein the indicators for the plurality of texts comprise presentation properties of the plurality of texts, and determining the first text satisfying the condition of being a negative sample from the plurality of texts comprises:
- selecting, from the plurality of texts, a text having a presentation property indicating that the text is to be presented in a folded mode, to obtain the first text.

8. The method according to claim 1, wherein the indicators for the plurality of texts comprise indicators for publishers of the plurality of texts, and determining the first text satisfying the condition of being the negative sample from the plurality of texts comprises:
- selecting, from the plurality of texts, a text having an indicator for a publisher of the text that is greater than a pre-determined indicator threshold, to obtain the first text,
- wherein the indicator for the publisher of the text comprises at least one selected from the group consisting of a proportion of texts published by the publisher of the text being collected texts, and a repetition rate of the texts published by the publisher of the text.

9. The method according to claim 1, wherein the indicators for the plurality of texts comprise presentation properties of the plurality of texts, and determining the first text satisfying the condition of being the negative sample from the plurality of texts comprises:
- selecting, from the plurality of texts, a text having a presentation property indicating that the text is to be presented in a folded mode, to obtain the first text.

10. The method according to claim 9, wherein the indicators for the plurality of texts further comprise behavior data for the plurality of texts and indicators for publishers of the plurality of texts, and selecting, from the plurality of texts, the text having the folded presentation as the presentation property, to obtain the first text comprises:
- determining the text selected from the plurality of texts having the presentation property indicating that the text is to be presented in the folded mode as a candidate text; and
- removing, based on at least one of the behavior data for the text and the indicator for the publisher of the text, the target text from a plurality of candidate texts, to obtain the first text.

11. A method of determining text quality, comprising:
- inputting a text to be processed to a text quality assessment model, to obtain output data of the text quality assessment model; and
- determining a category of the text to be processed based on the output data,
- wherein the text quality assessment model trained using the method of claim 1.

12. An electronic device, comprising:
- at least one processor; and
- a memory communicatively connected to the at least one processor, wherein the memory stores instructions executable by the at least one processor, and the instructions, when executed by the at least one processor, cause the at least one processor to:
- determine a first text satisfying a condition of being a negative sample and a second text satisfying a condition of being a positive sample from a plurality of texts based on indicators for the plurality of texts;
- for any text of the first text and the second text, add a label to the text based on the condition satisfied by the text, wherein the label indicates a category of the text, and the category comprises a low-quality category for the negative sample and a non-low-quality category for the positive sample; and
- constitute a training set by the first text having a label and the second text having a label, to train a text quality assessment model,
- wherein the text quality assessment model comprises a semantic representation network and a fully connected layer, the semantic representation network is configured to extract a semantic feature, the fully connected layer is configured to map the semantic feature to a category-dimensional space and output a classification prediction result, and before training the text quality assessment model, the at least one processor is further configured to:
- train the semantic representation network based on the plurality of texts, to obtain a pre-trained semantic representation network; and
- obtain the text quality assessment model by splicing the fully connected layer in an output direction of the pre-trained semantic representation network,
- wherein the at least one processor is further configured to:
- after training the text quality assessment model,
- retrain the trained text quality assessment model by using a target text as a training sample, wherein the target text has a manual annotation label indicating a true category of the text.

13. A non-transitory computer-readable storage medium having computer instructions stored thereon, wherein the computer instructions are configured to cause a computer to:
- determine a first text satisfying a condition of being a negative sample and a second text satisfying a condition of being a positive sample from a plurality of texts based on indicators for the plurality of texts;

for any text of the first text and the second text, add a label to the text based on the condition satisfied by the text, wherein the label indicates a category of the text, and the category comprises a low-quality category for the negative sample and a non-low-quality category for the positive sample; and constitute a training set by the first text having a label and the second text having a label, to train a text quality assessment model, wherein the text quality assessment model comprises a semantic representation network and a fully connected layer, the semantic representation network is configured to extract a semantic feature, the fully connected layer is configured to map the semantic feature to a category-dimensional space and output a classification prediction result, and before training the text quality assessment model, the computer instructions are further configured to cause the computer to:

train the semantic representation network based on the plurality of texts, to obtain a pre-trained semantic representation network; and obtain the text quality assessment model by splicing the fully connected layer in an output direction of the pre-trained semantic representation network, wherein the computer instructions are further configured to cause the computer to:

after training the text quality assessment model, retrain the trained text quality assessment model by using a target text as a training sample, wherein the target text has a manual annotation label indicating a true category of the text.

* * * * *